United States Patent [19]

Ching

[11] Patent Number: 5,779,205
[45] Date of Patent: Jul. 14, 1998

[54] EXTENSIBLE WINDSHIELD PORTABLE PHONE HOLDER

[76] Inventor: Allen Ching, 380 Thor Pl., Brea, Calif. 92821

[21] Appl. No.: 772,424

[22] Filed: Dec. 23, 1996

[51] Int. Cl.⁶ ..................................................... A45D 42/14
[52] U.S. Cl. .............................. 248/205.8; 248/298.1; 349/446
[58] Field of Search ................. 248/205.8, 205.7, 248/205.5, 288.11, 292.12, 298.1; 349/446, 449

[56] References Cited

U.S. PATENT DOCUMENTS

| | | | |
|---|---|---|---|
| 4,813,640 | 3/1989 | Perentin | 248/205.8 |
| 4,842,174 | 6/1989 | Sheppard et al. | 224/273 |
| 5,187,744 | 2/1993 | Richer | 379/449 |
| 5,392,350 | 2/1995 | Swanson | 379/446 |
| 5,396,556 | 3/1995 | Chen | 379/446 |
| 5,568,549 | 10/1996 | Wang | 379/446 |

*Primary Examiner*—Ramon O. Ramirez
*Assistant Examiner*—Anita M. King

*Attorney, Agent, or Firm*—David & Raymond; Raymond Y. Chan

[57] ABSTRACT

An extensible windshield portable phone holder includes an extensible holder arrangement, which includes a supporter, a sucking device for firmly attaching to a predetermined position of a windshield and an extending device, and a phone holder mounted on the supporter and adapted to hold a portable phone thereon. The extending device includes an elongated rack connected to the phone holder, a supporting arm connecting to the sucking device and including an axial guiding tubular rail for slidably receiving the elongated rack, a locking switch mounted on the supporting arm for interlocking the elongated rack with the supporting arm to determine a transition position between the elongated rack and the supporting arm, so as to adjust the distance between the supporter and the sucking device. Furthermore, the locking switch can firmly lock the phone holder in position and can withstand the weight of the portable phone sat on the holder. Also, since the holder can be extended to a handy position above the dashboard for the driver, the drivers can easily dial a phone call without moving their sight away from the road condition.

28 Claims, 6 Drawing Sheets

EXTENSIBLE WINDSHIELD PORTABLE PHONE HOLDER

BACKGROUND OF THE PRESENT INVENTION

The present invention relates to a portable phone holding apparatus, and more particularly to an extensible windshield portable phone holder with hand free arrangement which enables the portable phone to be held in a designated position and provides the portable phone hand free convenience while drivers are driving.

According to our statistic every year, the rate of auto accident are growing at tremendously fast rate. As the population increases, the number of drivers also increases and the more drivers we have on the roads the more likely the number of road accidents will increase. Auto accidents occur in many ways, knowing how bad it is out there we should try our best to prevent and avoid getting into an auto accident. An accident can happen in a split second, but after many years of driving experience, drivers seem to not pay as much attention on the road thinking that they have master the skill in driving. Today, many drivers do more than driving when they are in an automobile, eating, drinking, playing and etc., which sometimes end up getting into an accident.

In our working society today, many people owned portable phones due to their job and most of the workers use their portable phones while driving. Using portable phones while driving is not a very smart thing to do because drivers cannot pay full attention to the road and when this happens, the chance of getting into a car crack is a lot more greater.

There was a prior hand free phoning system, a cigarette lighter plug-in speaker phone unit. The problem with the plug-in speaker phone unit is that, the distance between the driver and the speaker phone is too far apart and sometimes it is hard to communicate through a microphone from a far distance. Also, the portable phone itself have to be placed somewhere nearby due to the wire adaptation of the unit, and knowing by placing the portable phone all over the place can shorten the life of the phone. Placing the portable phone on the seats can sometime be accidentally sat on or dropped and broken due to its fragile construction.

A phone call is sometime very important, but we know the danger of the split second accident, so to find a way to be able to use our portable phones while driving and not have to worry about the phone being damaged and at the same time having both hands on the steering wheel, that would be a solution to all the above problems.

Of course, we can mount a holder on the dashboard for temporary placing the portable phone thereon. However, most of the drivers refuse to drill holes or glue on the dashboard of their favorite cars. Besides, the conventional portable phone holder is not handy enough that the fixed position of the holder may be too far away from reaching by the driver's hand. This problems is unable to solve since most the existing conventional extending device may not afford the down pulling weight of the portable phone itself Besides, it is still a great unsolved problem when a driver needs to dial a phone with the low positioned portable phone. At that moment, the driver's attention will be diverted from the road condition that accident will be happened anytime.

SUMMARY OF THE PRESENT INVENTION

The main object of the present invention is to provide an extensible windshield portable phone holder, capable of firmly attaching to the front windshield and extending to a desired handy position to the driver. Moreover, the driver can adjust the location of the portable phone holder any time easily.

Another object of the present invention is to provide an extensible windshield portable phone holder, in which the extending device comprises a locking switch which can firmly lock the phone holder in desired position and can withstand the weight of the portable phone sat on the phone mounting device such as a phone holder or a phone cradle.

Another object of the present invention is to provide an extensible windshield portable phone holder which is equipped with a hand free arrangement to provide the portable phone hand free convenience while driving, so that the drivers can have both of their hands on the steering wheel for driving safety, which can bring down the rate of driving accident every year.

Another object of the present invention is to provide an extensible windshield portable phone holder, in which the phone mounting device is extended to a handy position above the dashboard for the driver, so that the drivers can easily dial a phone call without diverting their attention and sight apart from the road condition.

Accordingly, an extensible windshield portable phone holder of the present invention comprises an extensible holder arrangement, which comprises a supporter, a sucking device for firmly attaching to a predetermined position of a windshield, an extending device, and a phone holding device mounted on the supporter and adapted to hold a portable phone thereon. The extending device comprises an elongated rack connected to the phone holder, a supporting arm which is connected to the sucking device comprising an axial guiding tubular rail for slidably receiving the elongated rack and having a mounting opening provided thereon, a locking switch mounted on the supporting arm for interlocking the elongated rack with the supporting arm to determine a transition position between the elongated rack and the supporting arm, so as to adjust the distance between the supporter and the sucking device. The elongated rack has a plurality of equally spaced and parallelly positioned transverse locking grooves provided thereon. The locking switch comprises a turning axle pivotally and coaxially mounted on the supporting arm, i.e. perpendicular with the transverse locking grooves. The locking switch further comprises a lock plug and a turner, in which the lock plug can be downwardly extended from the turning axle through the mounting opening and inserted into one of the transverse locking grooves of the elongated rack by turning the turner. The turner is extended upwardly form the turning axle for rotating the turning axle to turn the lock pin downwards into the respective locking groove or upwards away from the respective locking groove.

The supporting arm comprises two axle stands protruded thereon and positioned above the mounting opening, each of the axle stands has an opposing axle hole. The turning axle has two ends rotatably inserted into the two axle holes of the two axle stands respectively.

The extensible windshield portable phone holder further comprises a hand free arrangement which comprises a speaker device, a mounting board extending from the speaker device, a cigarette lighter adapter connected to the speaker device by means of an extensible wiring for plugging in the cigarette lighter of the car for power supply for the speaker device, and a portable phone connector connected with the speaker device for plugging in an output socket of the portable phone, and a microphone incorporated

DETAILED DESCRIPTION OF THE PREFERRED EMBODIMENT

Figure 1:
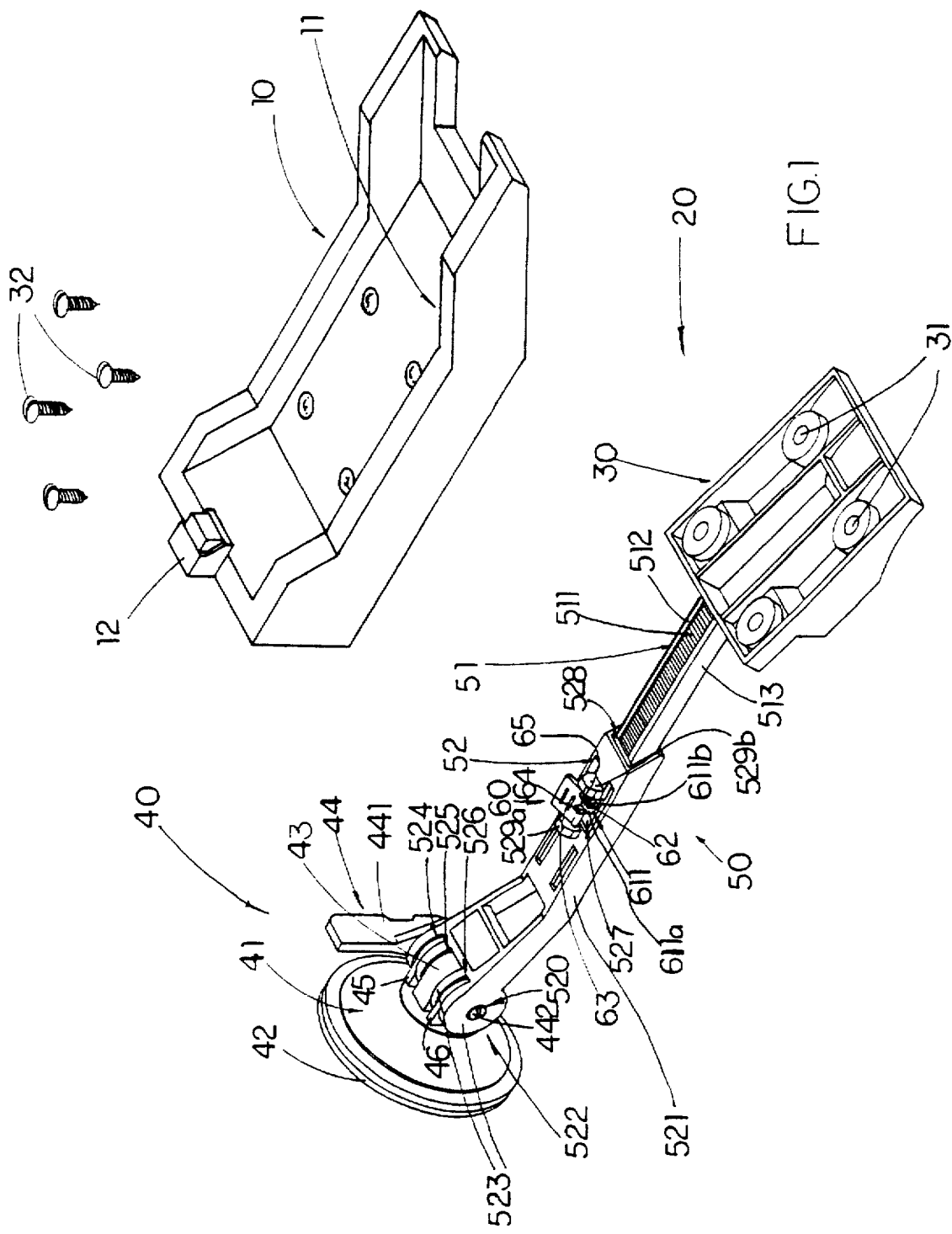
FIG. 1 is perspective view of an extensible holder arrangement and a phone mounting device of an extensible windshield portable phone holder according to a preferred embodiment of the present invention.
Figure 2:
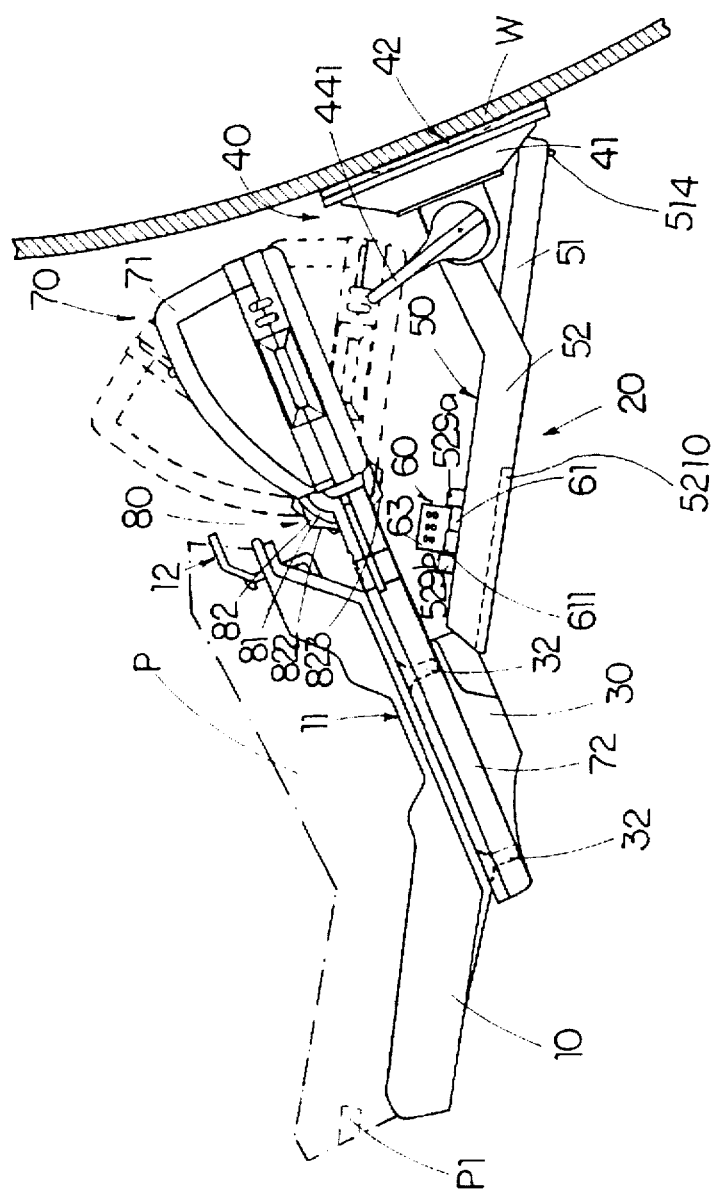
FIG. 2 is a side view of the extensible windshield portable phone holder equipped with a hand free arrangement according to the above preferred first embodiment of the present invention.
Figure 3:
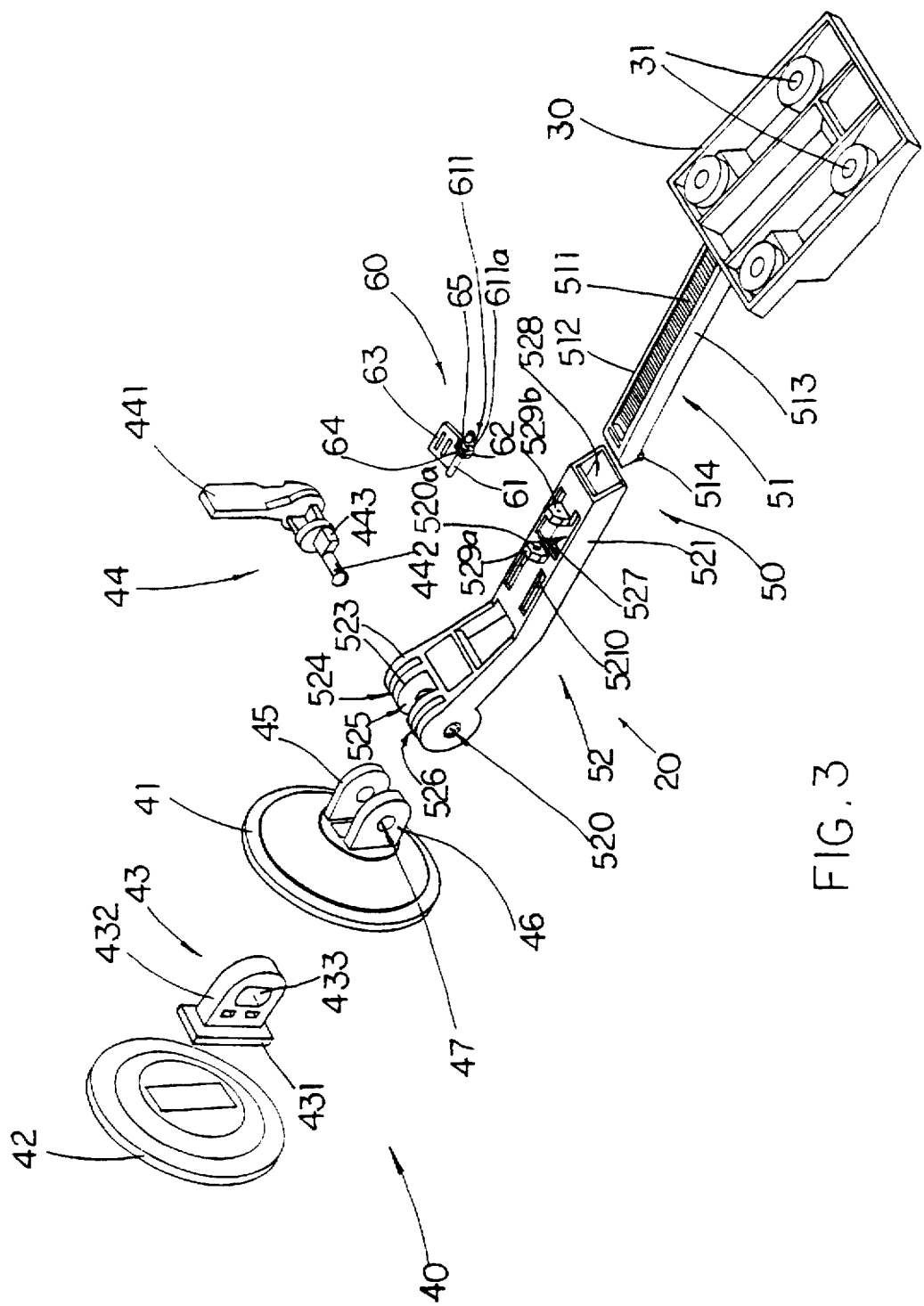
FIG. 3 is a exploded perspective view of an extensible holder arrangement of the extensible windshield portable phone holder according to the above preferred embodiment of the present invention.
Figure 4A:
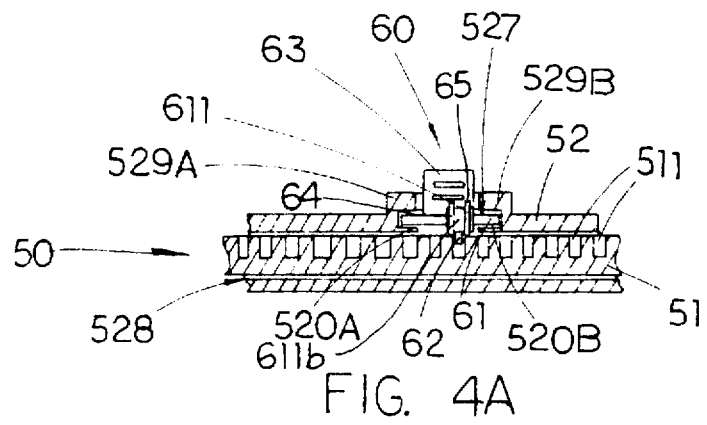
FIG. 4A is a partial sectional side view of the extending device of the extensible windshield portable phone holder according to the above preferred embodiment of the present invention, showing the locking switch in a locking position.
Figure 4B:
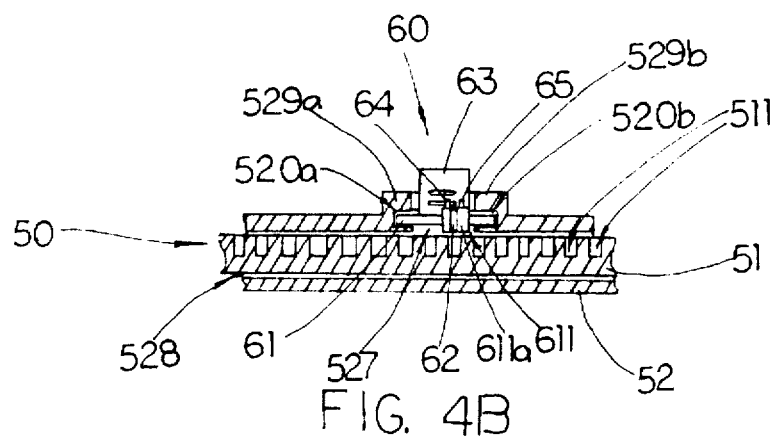
FIG. 4B is a partial sectional side view of the extending device of the extensible windshield portable phone holder according to the above preferred embodiment of the present invention, showing the locking switch in a unlock position.
Figure 5:
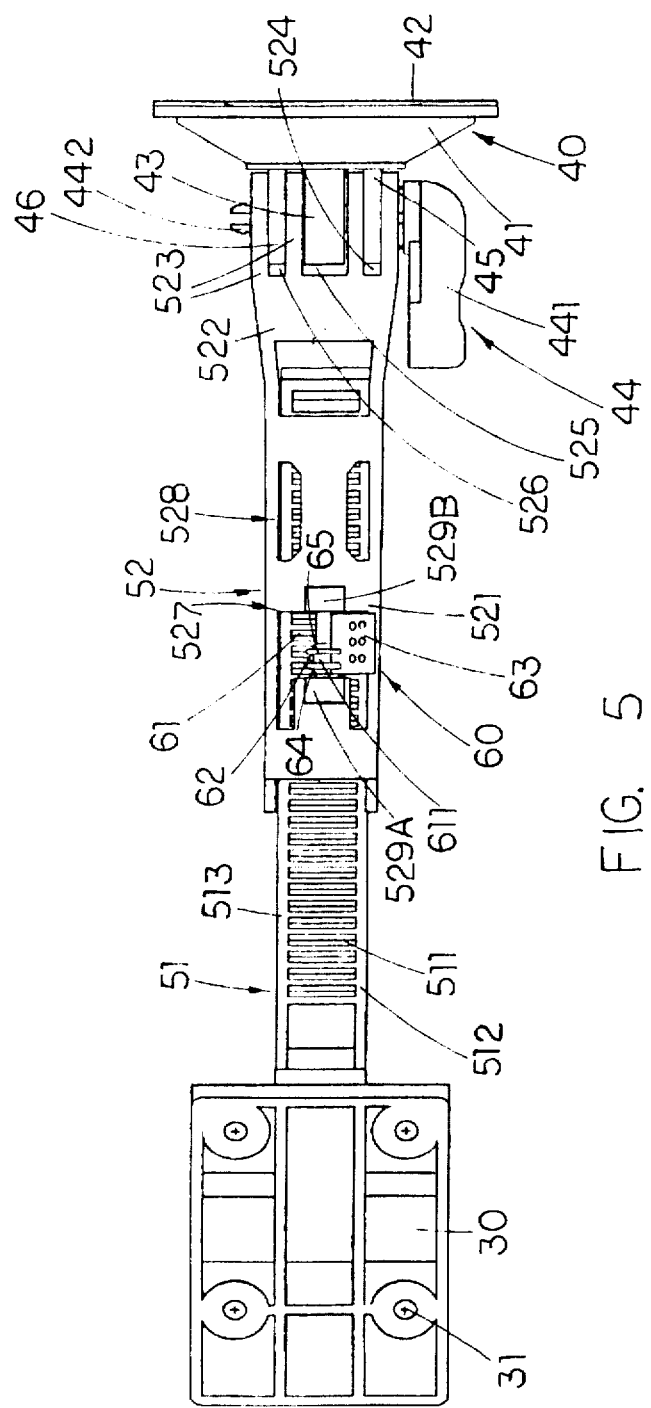
FIG. 5 is a front view of the extensible holder arrangement of the extensible windshield portable phone holder according to the above preferred embodiment of the present invention.

Referring to FIGS. 1 to 6 of the drawings, an extensible windshield portable phone holder is illustrated. The extensible windshield portable phone holder comprises a phone mounting device 10, such as a phone holder or a phone cradle, and an extensible holder arrangement 20 which comprises a plate like supporter 30 having four screw mounting holes 31 punctured evenly thereon, as shown in FIGS. 1, 3 and 5, a sucking device 40 for firmly attaching to a predetermined position of a windshield W (as shown in FIG. 2) and an extending device 50.

The extending device 50 comprises an elongated rack 51 connected to the phone supporter 30, a supporting arm 52 which is connected to the sucking device 40 comprising an axial guiding tubular rail 521 for slidably receiving the elongated rack 51, a locking switch 60 mounted on the supporting arm 52 for interlocking the elongated rack 51 with the supporting arm 52 to determine a transition position between the elongated rack 51 and the supporting arm 52, so as to adjust the distance between the supporter 20 and the sucking device 40.

As shown in FIGS. 1, 2, 3, and 5, the supporting arm 52 further comprises a hinge unit 522 inclinedly and integrally connected to one end of the guiding tubular rail 521. The hinge unit 522 comprises four holding wings 523 to define three receiving slots 524, 525, 526 therebetween and an axle hole 520 therethrough.

As shown in FIGS. and 2, the phone mounting device 10 is mounted on the supporter 30 by means of four mounting screws 32 screwed to the four screw mounting holes 31. The phone mounting device 10, which has a portable phone receiving cavity 11 and a holding means 12 installed thereon, is adapted to hold and retain a portable phone P thereon.

The sucking device 40, as shown in FIGS. 1, 2, 3, and 5, comprises a suction cup 41, a suction rubber cup 42, a suction cup lifter 43, and a suction switch 44. The suction cup integrally connected with two parallel hinge plugs 45, 46 having a through hole 47 provided therethrough. As shown in FIG. 3, the suction cup lifter 43 has an engaging head 431 integrally embedded with the suction rubber cup 42 and a lifting plug 432 having a transverse driven hole 433 provided therethrough.

As shown in FIGS. 1, 2 and 3, the lifting plug 432 penetrates through the suction cup 41 and inserts into the middle receiving slots 525 of the hinge unit 522. The sucking device 40 is rotatably hinged to the hinge unit 522 by inserting the two hinge plugs 45, 46 into the two respective receiving slots 524 and 526. The suction switch 44 comprises a turning handle 441 and a connecting pole 442 having an enlarged middle driving portion 443 for inserting through the axle hole 520 of the hinge unit 522, the through hole 47 of the hinge plugs 45, 46 and the driven hole 433 of the lifting plug 432, wherein the square middle portion 443 is just positioned at the square hole 433. Therefore, when the turning handle 441 is rotated anti-clockwise, the suction cup lifter 43 is driven inwards to lift the suction rubber cup 42 away from the windshield W to firmly suck on the windshield W, as shown in FIG. 2. However, when the turning handle 441 is rotated clockwise, the suction cup lifter 43 is driven outwards to drive the suction rubber cup towards the windshield W for releasing the suction force of the suction rubber cup 42 to enable the sucking device 40 to be detached from the windshield W.

Besides the weight of the portable phone sat on the phone mounting device 10, when the phone users put their portable phone P on the phone mounting device 10 and try to clip lock with the holding means 12 or when the phone users attempt to lift the portable phone P from the phone mounting device 10 and try to release the clip lock of the holding means 12, as shown in FIG. 2, an additional heavy downward force will be applied by the users onto the phone mounting device 10, that may drive the phone mounting device 10 tending to move downward. In others words, an extending force is applied to the extending device 50 at that moment. The heavy pulling force renders the conventional portable phone holder unable to be constructed with extending device since the common conventional pressing or fiction type locking means may not withstand such pulling force. In order words, the distance between the mounting means for mounting on the dashboard of the car and the phone holder can not be adjusted. In accordance with the present invention, the above problem can be solved by the specific feature provided by the extending device 50 of the present invention.

Referring to FIGS. 1 to 5, the elongated rack 51 is inclinedly and integrally connected with the supporter 30 and, along the length of an upper side of the elongated rack 51, has a plurality of equally spaced and parallelly positioned transverse locking grooves 511 provided between two side walls 512, 513 of the elongated rack 51. The guiding tubular rail 521 has a mounting opening 527 provided thereon and an axial receiving through cavity 528 having a width and a thickness slightly larger than a width and a thickness of the elongated rack 51 for adapting to slidably receive the elongated rack 51 therethrough.

As shown in FIG. 3, at a free end of the elongated rack 51, a stopper 514 is downwardly protruded therefrom. A transverse stopping wall 5210 is provided at a middle portion of a bottom side of the guiding tubular rail 521, so that when the elongated rack 51 is pulling outwards, the stopper 514 would be blocked by the transverse stopping wall 5210 to stop the elongated rack 51 from entirely withdrawing from the supporting arm. Such configuration is designed to prevent the elongated rack 51, the phone mounting device 10 and the portable phone P from accidently falling down while the locking switch 60 is unlocked.

The locking switch 60, as shown in FIGS. 1 to 5, comprises a turning axle 61 pivotally and coaxially mounted on the supporting arm 52 and positioned above the mounting opening 527, i.e. perpendicular with the transverse locking grooves 511. The turning axle 61 has an enlarged square head 611 positioned at the mounting opening 527. The locking switch 60 further comprises a lock plug 62 and a turner 63. The lock plug 62, which has a height and a width smaller than a depth and a width of the locking grooves 511 respectively, is perpendicularly protruded from a bottom side 61 la of the enlarged square head 611 of the turning axle 61. The turner 63 is integrally extended from an opposite corner of the enlarged square head 611.

Whereby, by turning the turner 63 aside, the locking plug 62 can be rotated downwardly and inserted into one of the transverse locking grooves 511 of the elongated rack 51, i.e. the locking condition. If the turner 63 is turned in the opposite direction, the locking plug 62 will be rotated upwardly away from the corresponding locking groove 511, i.e. the unlocking condition. Therefore, we can slide the elongated rack 51 in and out along the supporting arm 52 to adjust the distance between the sucking device 40 and the phone mounting device 10. Once the desire distance is adjusted, the user can simply turn the turner 63 to the locking condition. Then the elongated rack 51 is locked in position and can not be slidden in or out of the supporting arm 52 any more.

As shown in FIGS. 1 to 4, at least a position stopper 64, 65 is protruded on two edges of a front side 611b of the enlarged square head 611, between the bottom side 611a and the turner 63. According to the present embodiment there are two position stoppers 64, 65. As shown in FIG. 4A, when the locking switch 60 is turned to the locking position to wedge the lock plug 62 into the respective locking groove 511, the two position stoppers 64, 65 would prop on the elongated rack 51 to prevent the locking switch 60 being overturned, so as to ensure the locking plug 62 being precisely wedged into the corresponding locking groove 511.

A front side and a rear side of said mounting opening 527 of the supporting arm 52 further comprises two axle stands 524, 525 protruded thereon respectively, each of the axle stands 529a, 529b has an opposing axle hole 520a, 520b, as shown in FIG. 4A and FIG. 4B. The turning axle 61 has two ends rotatably inserted into the two axle holes 520a, 520b of the two axle stands 529a, 529b respectively.

Although the structure of the extending device 50 and locking switch 60 of the present invention is simple, the locking ability to the linear motion of the elongated rack 51 is great and effective. A physical theory is applied to the extending device 50, that is the most effective stopping force to a motion is the blocking force perpendicular to that motion, which is more effective than applying friction force or pressing force. According to the present invention, once the locking plug 62 is wedged into the respective locking groove 511, the linear axial sliding motion of the elongated rack 51 is entirely blocked by the transversal force formed by the locking plug 62, and thus the extending device 50 is effectively and firmly locked by the locking switch 60. Moreover, the manufacturing cost of the extending device 50 and the locking switch 60 is relatively low. The elongated rack 51, the supporting arm 52 and the locking switch 60 can be made by molding respectively. Simply insert the two ends of the turning axle 61 into the two axle holes 526, 527 of the two axle stands 524, 525 can assemble the locking switch 60.

Figure 6:
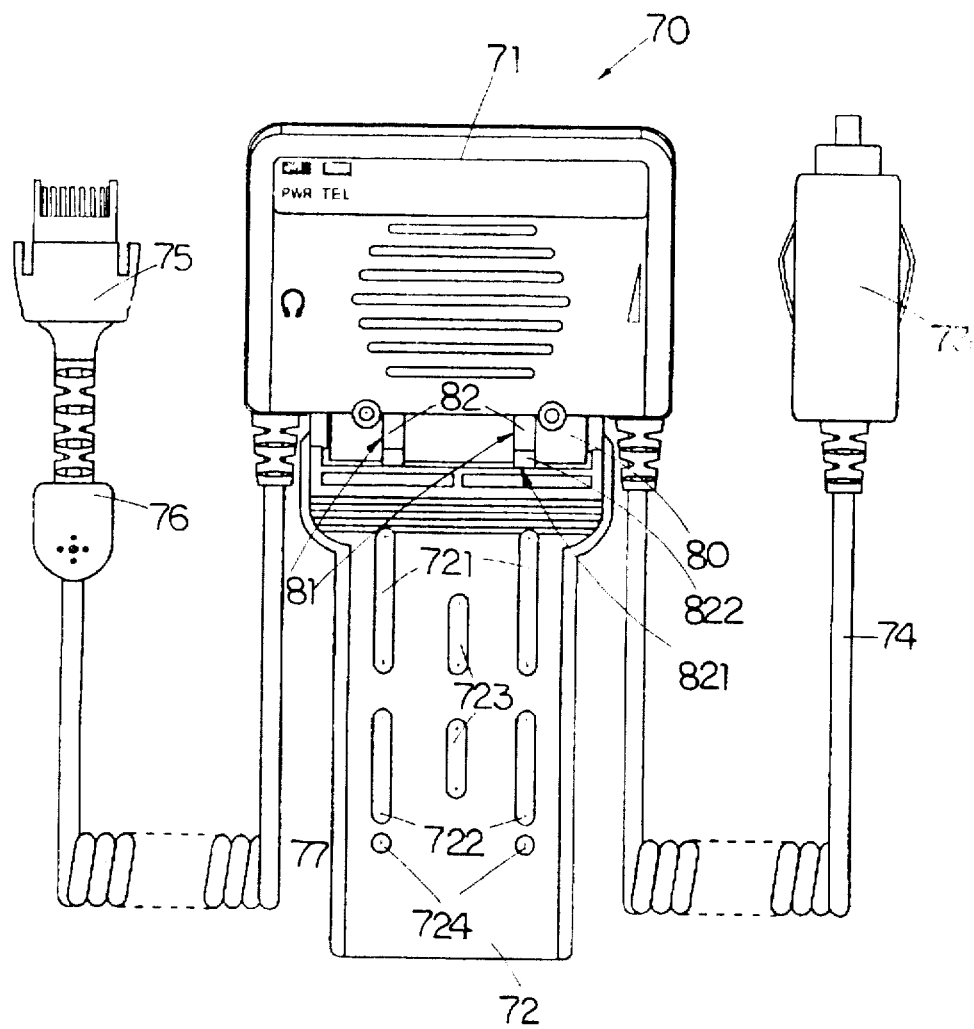
FIG. 6 is a font view of the hand free arrangement for incorporating with the extensible windshield portable phone holder according to the above preferred embodiment of the present invention.

The extensible windshield portable phone holder of the present invention, as shown in FIGS. 1 and 6, further comprises a hand free arrangement 70 which comprises a speaker device 71, a mounting board 72 extending from the speaker device 71, a cigarette lighter adapter 73 connected to the speaker device 71 by means of an extensible wiring 74 for plugging in the cigarette lighter of the car for power supply for the speaker device 71, and a portable phone connector 75 connected with the speaker device 71 for plugging in an output socket P1 of the portable phone P (as shown in FIG. 2), and a microphone 76 incorporated with the speaker device 71. According to the present embodiment, the portable phone connector 75 is connected with the speaker device 71 by means of a second extensible wiring 77. The microphone 76 is connected between the portable phone connector 75 and the second extensible wiring 77. The mounting board 72 is secured between the supporter 30 and the phone mounting device 10 so as to firmly mount the speaker device 71 in position.

A folding device 80 is provided between the speaker device 71 and the mounting board 72 for adjusting the positioning angle of the speaker device 71, as shown in FIG. 2. In accordance with the present invention, the folding device 80 comprises two hinge sockets 81 formed at a top end of the mounting board 72 for pivotally connected with two folding plugs 82. Each folding plug 82 has a bottom flat surface 821, a front inclined surface 822 and a rear inclined surface 823. Therefore, the speaker device 71 can positioned in upright position when the bottom flat surfaces 821 of the two folding plugs 82 are propped against the flat bottom surfaces of the two hinge sockets 81 respectively. The speaker device 71 can also be folded upwards or downwards to position in a front inclining position or a rear inclining position respectively by turning the front inclined surface 822 or the rear inclined surface 823 propping against the flat bottom surfaces of the hinge sockets 81.

Please referring to FIG. 6, due to the fact that there are many kinds of portable phone P of different size, there should be different kinds of phone mounting device 10 adapted for holding different types of portable phone P respectively. In order to made the extensible windshield portable phone holder becoming an universal structure adapted to fit all kinds of portable phone, the mounting board 72 of the hand free arrangement provides a plurality of elongated mounting holes 721, 722 and 723 and two bottom round holes 724, so that the user may penetrate the four mounting screws 32 through the two round holes 724 and any matching elongated mounting holes 721, 722 or 723 to secure the mounting board 72 between the extensible holder arrangement 20 and the hand free arrangement to incorporate with all kinds of phone mounting device 10 for different types of portable phone.

Figure 7:
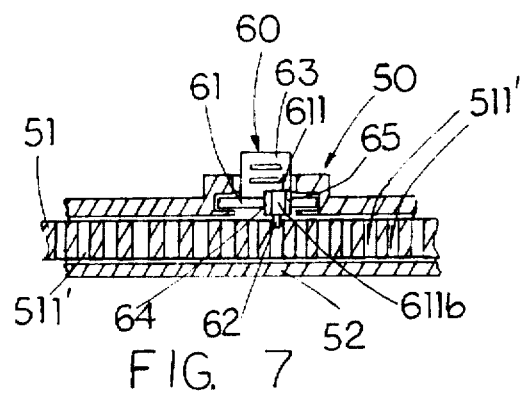
FIG. 7 is a partial sectional side view of an alternative mode of the extending device of the extensible windshield portable phone holder according to the above preferred embodiment of the present invention.

Referring to FIG. 7 is an alternative mode of the extending device 50, wherein the locking grooves 511 are through slots 511'. Basically, this alternative mode has the same effect as the above specified preferred embodiment.

According to the above disclosure, the extensible windshield portable phone holder of the present invention provides a locking switch which can firmly lock the phone holder in position and can withstand the weight of the portable phone sat on the holder. Therefore, the present invention can be incorporated with a hand free arrangement which can provide the portable phone hand free convenience while driving, so that the drivers can have both of their hands on the steering wheel for driving safety, which can bring down the rate of driving accident every year.

Hence, the drivers can simply suck the sucking device on a windshield of a car and extend the phone mounting device forwards to a handy position above the dashboard of the car for dialing and speaking. Since the portable phone holder of the present is attached to the windshield, the portable phone will be sat in an upper handy position that the drivers can easily dial a phone call without moving their sight away from the road condition.

I claim:

1. An extensible windshield portable phone holder, comprising
    a phone mounting device which has a portable phone receiving cavity for receiving a portable phone, and a holding means installed thereon for holding said portable phone in position; and
    an extensible holder arrangement which comprises
    a supporter for securing said phone mounting device thereon;
    a sucking device for firmly attaching to a predetermined position of a windshield; and
    an extending device which comprises
    an elongated rack, which is connected to said phone mounting device, having two side walls, on an upper side of said elongated rack, a plurality of parallel and equally spaced transverse locking grooves being provided between said two side walls;
    a supporting arm connecting to said sucking device and comprising an axial guiding tubular rail which has a mounting opening provided thereon and an axial receiving through cavity having a width and a thickness slightly larger than a width and a thickness of said elongated rack for slidably receiving said elongated rack therein; and
    a locking switch for interlocking said elongated rack with said supporting arm, comprising a turning axle pivotally and coaxially mounted on said supporting arm and positioned above said mounting opening, in which said turning axle is positioned perpendicular with said transverse locking grooves, said turning axle comprising a lock plug and a turner, wherein said lock plug which has a height and a width smaller than a depth and a width of said locking grooves respectively is perpendicularly protruded from said turning axle, and that said turner is extended from said turning axle outwardly for turning said locking plug to rotate downwardly and wedge into one of said transverse locking grooves of said elongated rack to interlock said elongated rack with said supporting arm, however when said turner is turned to rotate said locking plug upwardly away from said corresponding locking groove of said elongated rack, said elongated rack is able to be slidden in and out along said supporting arm to adjust a distance between said sucking device and said phone mounting device.

2. The extensible windshield portable phone holder, as recited in claim 1, in which said turning axle has an enlarged square head positioned at the mounting opening, said lock plug being protruded from a bottom side of said enlarged square head of said turning axle and said turner being integrally extend from an opposite corner of said enlarged square head.

3. The extensible windshield portable phone holder, as recited in claim 2, in which a front side and a rear side of said mounting opening of said supporting arm further comprises two axle stands protruded thereon respectively, each of said axle stands having an opposing axle hole for rotatably receiving two ends of turning axle respectively.

4. The extensible windshield portable phone holder, as recited in claim 2, in which said front side of said enlarged square head, between said bottom side and said turner, has at least a position stopper protruded on two edges of said front side, so that when said locking switch is turned to wedge said lock plug into said corresponding locking groove, said position stopper would prop on said elongated rack to prevent the locking switch being overturned.

5. The extensible windshield portable phone holder, as recited in claim 3, in which said front side of said enlarged square head, between said bottom side and said turner, has at least a position stopper protruded on two edges of said front side, so that when said locking switch is turned to wedge said lock plug into said corresponding locking groove, said position stopper would prop on said elongated rack to prevent the locking switch being overturned.

6. The extensible windshield portable phone holder, as recited in claim 1, in which at a free end of said elongated rack, a stopper is downwardly protruded therefrom, and that at a middle portion of a bottom side of said guiding tubular rail, a transverse stopping wall is provided, so that when said elongated rack is pulling outwards, said stopper would be blocked by said transverse stopping wall to stop said elongate rack from entirely withdrawing from said supporting arm.

7. The extensible windshield portable phone holder, as recited in claim 5, in which at a free end of said elongated rack, a stopper is downwardly protruded therefrom, and that at a middle portion of a bottom side of said guiding tubular rail, a transverse stopping wall is provided, so that when said elongated rack is pulling outwards, said stopper would be blocked by said transverse stopping wall to stop said elongate rack from entirely withdrawing from said supporting arm.

8. The extensible windshield portable phone holder, as recited in claim 1, in which said supporter has a plurality of screw mounting holes punctured thereon for screwing said phone mounting device thereon.

9. The extensible windshield portable phone holder, as recited in claim 1, in which said supporting arm further comprises a hinge unit integrally connected to one end of said guiding tubular rail, said hinge unit comprising four holding wings to define three receiving slots therebetween and an axle hole therethrough, said sucking device comprising a suction cup, a suction rubber cup, a suction cup lifter, and a suction switch, wherein said suction cup integrally connected with two parallel hinge plugs and having a through hole provided therethrough, said suction cup lifter having an engaging head integrally embedded with said suction rubber cup and a lifting plug having a transverse square hole provided therethrough, said lifting plug penetrating through said suction cup and inserting into said middle receiving slots of said hinge unit, said sucking device being rotatably hinged to said hinge unit by inserting said two hinge plugs into said two respective receiving slots, said suction switch comprising a turning handle and a connecting pole having a square middle portion for inserting through said axle hole of said hinge unit, said through hole of said hinge plugs and said square hole of said lifting plug, wherein said square middle portion is positioned at said square hole.

10. The extensible windshield portable phone holder, as recited in claim 7, in which said supporting arm further comprises a hinge unit integrally connected to one end of said guiding tubular rail, said hinge unit comprising four holding wings to define three receiving slots therebetween and an axle hole therethrough, said sucking device comprising a suction cup, a suction rubber cup, a suction cup lifter, and a suction switch, wherein said suction cup integrally connected with two parallel hinge plugs and having a through hole provided therethrough, said suction cup lifter having an engaging head integrally embedded with said suction rubber cup and a lifting plug having a transverse square hole provided therethrough, said lifting plug penetrating through said suction cup and inserting into said middle receiving slots of said hinge unit, said sucking device being rotatably hinged to said hinge unit by inserting said two hinge plugs into said two respective receiving slots, said suction switch comprising a turning handle and a connecting pole having a square middle portion for inserting through said axle hole of said hinge unit, said through hole of said hinge plugs and said square hole of said lifting plug, wherein said square middle portion is positioned at said square hole.

11. The extensible windshield portable phone holder, as recited in claim 1, in which said elongated rack is inclinedly connected with said supporter.

12. The extensible windshield portable phone holder, as recited in claim 1, further comprising a hand free arrangement which comprises a speaker device, a mounting board extending from said speaker device, a cigarette lighter adapter connected to said speaker device by means of an extensible wiring for power supply for said speaker device, and a portable phone connector connected with said speaker device for plugging in an output socket of said portable phone, and a microphone incorporated with said speaker device.

13. The extensible windshield portable phone holder, as recited in claim 12, in which said portable phone connector is connected with said speaker device by means of a second extensible wiring.

14. The extensible windshield portable phone holder, as recited in claim 13, in which said microphone is connected between said portable phone connector and said second extensible wiring.

15. The extensible windshield portable phone holder, as recited in claim 14, in which said mounting board is secured between said supporter and said phone mounting device so as to firmly mounted said speaker device in position.

16. The extensible windshield portable phone holder, as recited in claim 15, in which a folding device is provided between said speaker device and said mounting board for adjusting said positioning angle of said speaker device.

17. The extensible windshield portable phone holder, as recited in claim 16, in which said folding device comprises two hinge sockets formed at a top end of said mounting board for pivotally connected with two folding plugs, each said folding plug having a bottom flat surface, a front inclined surface and a rear inclined surface, wherein said speaker device is positioned in an upright position when said bottom flat surfaces of said two folding plugs are propped against said flat bottom surfaces of said two hinge sockets respectively, whereby said speaker device is able to be folded upwards to position in a front inclining position by turning said front inclined surface propping against said flat bottom surfaces of said hinge sockets, and folding downwards to position in a rear inclining position by turning said rear inclined surface propping against said flat bottom surfaces of said hinge sockets.

18. The extensible windshield portable phone holder, as recited in claim 17, in which said mounting board of said hand free arrangement provides a plurality of elongated mounting holes and two bottom round holes.

19. The extensible windshield portable phone holder, as recited in claim 7, further comprising a hand free arrangement which comprises a speaker device, a mounting board extending from said speaker device, a cigarette lighter adapter connected to said speaker device by means of an extensible wiring for power supply for said speaker device, and a portable phone connector connected with said speaker device for plugging in an output socket of said portable phone, and a microphone incorporated with said speaker device.

20. The extensible windshield portable phone holder, as recited in claim 19, in which said portable phone connector is connected with said speaker device by means of a second extensible wiring, and that said microphone is connected between said portable phone connector and said second extensible wiring.

21. The extensible windshield portable phone holder, as recited in claim 20, in which said mounting board is secured between said supporter and said phone mounting device so as to firmly mounted said speaker device in position.

22. The extensible windshield portable phone holder, as recited in claim 21, in which a folding device is provided between said speaker device and said mounting board for adjusting said positioning angle of said speaker device.

23. The extensible windshield portable phone holder, as recited in claim 22, in which said folding device comprises two hinge sockets formed at a top end of said mounting board for pivotally connected with two folding plugs, each said folding plug having a bottom flat surface, a front inclined surface and a rear inclined surface, wherein said speaker device is positioned in an upright position when said bottom flat surfaces of said two folding plugs are propped against said flat bottom surfaces of said two hinge sockets respectively, whereby said speaker device is able to be folded upwards to position in a front inclining position by turning said front inclined surface propping against said flat bottom surfaces of said hinge sockets, and folding downwards to position in a rear inclining position by turning said rear inclined surface propping against said flat bottom surfaces of said hinge sockets.

24. The extensible windshield portable phone holder, as recited in claim 23, in which said mounting board of said hand free arrangement provides a plurality of elongated mounting holes and two bottom round holes.

25. The extensible windshield portable phone holder, as recited in claim 1, in which said locking grooves are through slots.

26. The extensible windshield portable phone holder, as recited in claim 7, in which said locking grooves are through slots.

27. The extensible windshield portable phone holder, as recited in claim 10, in which said locking grooves are through slots.

28. The extensible windshield portable phone holder, as recited in claim 24, in which said locking grooves are through slots.

* * * * *